Patented Feb. 5, 1952

2,584,892

UNITED STATES PATENT OFFICE 2,584,892

METHOD OF MANUFACTURING SOUND RECORDING DISKS

William Edward Lord, Harlington, England, assignor to Electric and Musical Industries Limited, Hayes, England, a company of Great Britain No Drawing. Application July 14, 1947, Serial No. 760,935. In Great Britain July 15, 1946

2 Claims. (Cl. 117—47)

This invention relates to sound recording discs comprising a base having provided thereon a recording film on which a sound track can be formed for retaining a record of sound vibrations.

Heretofore aluminum discs have been widely used for the bases of such recording discs, and the sound track has been formed on a film of nitro cellulose composition. Aluminum discs of the requisite high surface quality are sometimes difficult and expensive to obtain and proposals to use plastic substitutes for the aluminum have encountered the difficulty of obtaining a base material and a recording film which can be caused to adhere firmly together and yet possess the qualities required for a recording disc.

The object of the invention, therefore, is to provide a satisfactory recording disc having a base comprising a plastic material.

According to the present invention there is provided a sound recording disc comprising a base formed of polyvinyl chloride plastic material and a recording film of nitro cellulose composition adhering to said base.

According to another feature of the present invention there is provided a method of manufacturing a sound recording disc comprising a base formed of polyvinyl chloride plastic material, wherein a recording film of nitro cellulose composition is deposited on said base from solution in a solvent composition which contains a solvent for polyvinyl chloride in amount sufficient to cause said film to adhere firmly to said base. It has been found that by employing polyvinyl chloride plastic material for the base and nitro cellulose composition for the recording film, the said film can be caused to adhere firmly to the base and provide a satisfactory sound recording disc. The polyvinyl chloride plastic material is not dissolved or appreciably softened by many of the conventional solvents and diluents used for nitro cellulose compositions; e. g., aliphatic esters, alcohols, and petroleum hydrocarbons, and the amount of the active solvent for polyvinyl chloride which is employed is controlled so that while it is sufficient to soften the surface layer of the base or cause it to swell up and thereby cause the recording film to adhere firmly, the amount is insufficient to cause a "wash-up" of the base, that is, a mixing of the constituents thereof with the recording film to such an extent as to impair seriously the qualities of the recording disc.

A cyclic ketone such as cyclohexanone, or methyl cyclohexanone, which is known by the trade name "Sextone B," has been found to be a suitable solvent for polyvinyl chloride which can be employed in the method according to the invention, and satisfactory results are obtained if it comprises between 10 and 30 percent by weight of the solvent composition from which the nitro cellulose composition is deposited.

The polymer in the plastic material is preferably an unmodified polymer of vinyl chloride, other polyvinyl esters being absent or substantially so.

In one example of the invention, in order to form the base of the recording disc, a plasticiser is added to the polyvinyl chloride and the preferred plasticiser is a high molecular weight phthalic ester, e. g., dioctyl phthalate, or a high molecular weight aryl phosphate, e. g., tricresyl phosphate. The amount of the plasticizer is preferably confined to between 5 and 15 percent by weight of the constituents of the base material in order to obtain a base which is sufficiently rigid, the degree of rigidity being adjustable by varying the plasticiser content. In addition, a quantity of a suitable filler such as slate powder, e. g., Trego earth, and a small quantity of stabiliser, e. g., litharge, are added. A suitable composition for the base material is as follows:

|  | Per cent |
|---|---|
| Polyvinyl chloride | 67.9 |
| Dioctyl phthalate | 7.53 |
| Litharge | 0.63 |
| Trego earth | 23.94 |

This base material is calendered into sheets of suitable thickness and is then polished by hot-pressing and cooling it between sheets of polished metal in a manner similar to that employed in the manufacture of Celluloid sheet material. Discs to form the bases of the sound recording discs may be cut from the sheet before or after pressing. Discs so made are of high surface quality and good dimensional stability, the surface quality being comparable with that of aluminum.

The recording film of a nitro cellulose composition containing a conventional plasticizing agent, such as castor oil, is then cast on to the base from a cold solution in a solvent composition which comprises a conventional solvent, or solvent mixture for nitro cellulose compositions. The nitro cellulose composition may be the same as that which has hitherto been commonly employed for the recording film in the manufacture of sound recording discs, for example, a mixture of nitro cellulose having a viscosity of half a second with half its weight of raw castor oil. The solvent composition, as stated above, also comprises a controlled amount of a solvent for polyvinyl chloride which swells or slightly dissolves the surface of the base sufficiently to cause the recording film to adhere firmly to it.

A suitable solvent for polyvinyl chloride is cyclohexanone or its methyl-derivative, Sextone B, and the amount employed is between 10 and 30 percent and preferably 20 percent, by weight, of the solvent composition, the constituents which are for example the following:

|  | Percent |
|---|---|
| Acetone | 50.00 |
| Butanol | 4.87 |
| The substance known by the registered trade-mark "Cellosolve," ethylene glycol monoethylether | 25.13 |
| Sextone B | 20.00 |

I claim as my invention:

1. A method of manufacturing sound recording discs comprising providing a synthetic resin base consisting essentially of polyvinyl chloride and 5–15% by weight of a plasticizer therefor, pressing a surface of said base to obtain a polished surface, and depositing on said polished surface a film from a cold solution comprising nitrocellulose, a plasticizer for said nitrocellulose, and a solvent combination consisting of 10–30% by weight cyclohexanone and the remainder being solvents for said nitrocellulose.

2. A method according to claim 1 wherein said solvent for polyvinyl chloride comprises about 20 percent by weight of said solvent composition and wherein said base includes about 24% by weight of a filler.

WILLIAM EDWARD LORD.

REFERENCES CITED

The following references are of record in the file of this patent:

UNITED STATES PATENTS

| Number | Name | Date |
|---|---|---|
| 1,146,414 | Edison | July 13, 1915 |
| 1,932,889 | Groff | Oct. 31, 1933 |
| 2,006,378 | Whyte et al. | July 2, 1935 |
| 2,030,568 | Bren | Feb. 11, 1936 |
| 2,206,636 | Hunter | July 2, 1940 |
| 2,417,405 | Bellac | Mar. 18, 1947 |

FOREIGN PATENTS

| Number | Country | Date |
|---|---|---|
| 484,434 | Great Britain | May 5, 1938 |
| 489,725 | Great Britain | Aug. 3, 1938 |
| 570,915 | Great Britain | July 27, 1945 |

OTHER REFERENCES

Handbook of Plastics, Simonds-Ellis, July 1943, pages 242–243.